Dec. 29, 1925.  
G. C. McINTYRE ET AL  
1,567,376  
BATTERY ELECTROLYTE LEVEL INDICATING MEANS  
Filed June 11, 1923

Inventor  
GEORGE C. McINTYRE.  
STEPHEN L. BARLOW.

By A. B. Bowman  
Attorney

Patented Dec. 29, 1925.

1,567,376

UNITED STATES PATENT OFFICE.

GEORGE C. McINTYRE AND STEPHEN L. BARLOW, OF SAN DIEGO, CALIFORNIA.

BATTERY ELECTROLYTE-LEVEL-INDICATING MEANS.

Application filed June 11, 1923. Serial No. 644,678.

*To all whom it may concern:*

Be it known that we, GEORGE C. McINTYRE and STEPHEN L. BARLOW, citizens of the United States, residing at San Diego, in the county of San Diego and State of California, have invented certain new and useful Battery Electrolyte-Level-Indicating Means, of which the following is a specification.

Our invention relates to storage battery electrolyte level indicating means, and the objects of our invention are: first, to provide an electrode in combination with the conventional filling cap of a storage battery, which electrode is adapted to extend into the electrolyte of the cell when the plates thereof are covered with a sufficient amount of liquid or electrolyte, and which electrode is connected with a signaling means for indicating to the operator of the automobile or other vehicle when the electrolyte in the cell has been used to or beyond a predetermined low level; second, to provide an electrode in connection with the filling cap of the storage battery which is resiliently secured thereto and may be easily removed therefrom for replacing the electrode or filling the cell with water; third, to provide a luminous signaling means connected to the electrode extending into the electrolyte of said cell, and a spring switch in close proximity to said signaling means whereby the level of the electrolyte in the cell will be indicated by the signaling means when the switch in connection therewith is operated; fourth, to provide a novelly constructed means of this class, and fifth, to provide a means of this class which is particularly simple and economical of construction, durable, practical, compact, and which will not readily deteriorate or get out of order.

Figure 1:
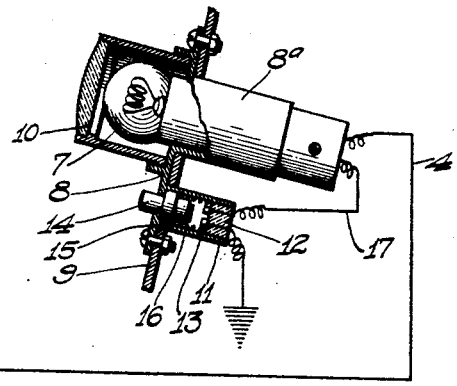
Figure 1:
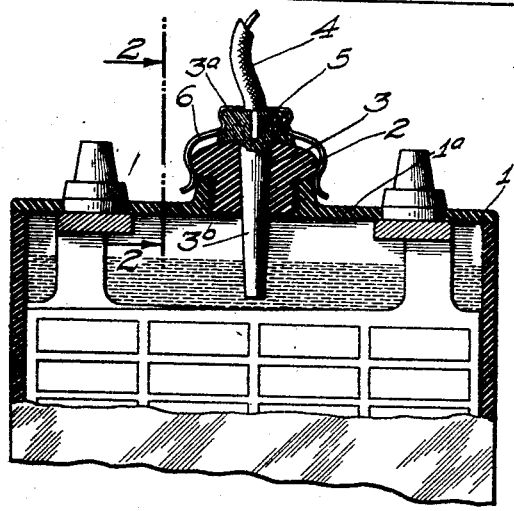
Figure 2:
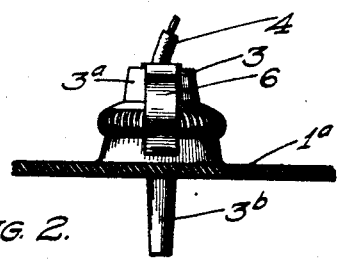

With these and other objects in view, as will appear hereinafter, our invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a fragmentary, side elevational view of the storage battery cell with our terminal means secured thereto and connected diagrammatically to the luminous signaling means and a switch, showing certain parts and portions of the cell, the electrode, the supporting means and the signaling and switch means partly broken away and in section to facilitate the illustration, and Fig. 2 is a fragmentary sectional view through 2—2 of Fig. 1.

Like characters of reference refer to similar parts and portions throughout the views of the drawings.

A container 1, filling opening cap 2, electrode 3, conductor 4, screw 5, resilient retaining member 6, bulb 7, plate 8, dash member 9, bulb guard 10, switch casing 11, insulating member 12, contact members 13, switch member 14, spring 15, contact member 16, and the conductor 17, constitute the principal parts and portions of our battery electrolyte level indicating means.

The electrode 3, which is made of lead or other suitable conducting material, is positioned in and extends through the filling opening cap 2, which is detachably secured in the filling opening of the cover member 1ª of the cell container 1 by means of threads or other convenient means. The electrode 3 is provided with an enlarged portion 3ª at its upper end, which conforms at its lower sides with the top of the cap 2. The portion 3ᵇ of the electrode which extends downwardly through the cap 2 is tapered towards its lower end and conforms with and fits snugly within the tapered opening in said cap. The lower end of said electrode is spaced from the upper edges of the plate of the cell and is adapted to extend into the electrolyte when the same is at or above its normal safe level. To the upper enlarged portion of the electrode is secured the resilient retaining member 6, which extends outwardly therefrom and downwardly in loop form, which loop extends over and resiliently engages the upper, laterally extended side portion of the cap 2, and thus detachably secures the electrode therein. The conductor 4 is secured at its one end in the upper end of the electrode in any convenient manner, preferably by means of a screw 5, substantially as shown in the drawings. The other end of said conductor is connected with the bulb 7, which is mounted in the socket portion 8ª of the plate 8, which plate is secured to the dash member 9 of the vehicle or other instrument board. Positioned over the bulb 7 and secured at the front portion of said plate is the transparent bulb guard 10. Supported by said plate contiguous to said bulb and extending therefrom is the switch casing 11, at the one end of which is positioned the insulating member 12, through which extends the conductor 17 connected to the bulb 7 and another conductor grounded on the vehicle frame. On said insulating member 12 are secured the contact members 13, one connected to the end of the conductor 17 and the other connected to said grounded conductor. The switch member 14 of insulating material is reciprocally mounted in the other end of the switch casing and extends through and forwardly from the plate 8. A spring 15 is positioned in said switch casing and forces the switch member 14 outwardly. At the inner end of said switch member is secured the contact member 16 which is adapted to simultaneously engage the two contact members 13 and close the circuit from the battery, through the bulb 7, to the ground when the electrolyte of the cell is at a sufficiently high level to cause a current to flow through the electrode 3.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

It is obvious from this construction that there is provided a storage battery low level signaling means in which an electrode is positioned and extends through the conventional filling opening cap and is adapted to extend into the electrolyte of the cells in which it is secured; that said electrode is resiliently secured in said cap and may be easily removed therefrom for filling the cell or for other purposes; that the electrode is so positioned in the cell to cause a current to flow therefrom to a signaling means with which it is connected; that no signal will be given until a certain switch is operated; that by reason of a resilient switch mechanism very little energy will be used in giving the signal; that there is provided a novel, simple and economically constructed device of this class, and a device which is very practical and which will not readily deteriorate or get out of order.

Having thus described our invention, what we claim as new and desire to secure by Letters Patent is:

1. A means of the class described, including a conventional storage battery cell cap detachably secured to the cell container and provided with an opening there-through, an electrode provided with a shoulder thereon removably positioned in said cap, and a resilient metallic electrode retaining member secured to said electrode and adapted to resiliently engage said cap and secure said electrode in position.

2. A means of the class described, including a storage battery cell container provided with a small opening through its cover portion, an electrode readily removably positioned in said opening and adapted to extend into the electrolyte of said cell, and a resilient metallic retaining member resiliently securing said electrode in position.

3. A means of the class described, including a storage battery cell container provided with a small opening through its cover portion, an electrode removably positioned in said opening and adapted to extend into the electrolyte of said cell, and a resilient metallic retaining member secured to the upper portion of said electrode and adapted to resiliently engage an extended portion contiguous to the opening in the cover portion of said container.

4. A means of the class described, including a storage battery cell container provided with a small, downwardly tapered opening through its cover portion, a tapered electrode snugly and removably positioned in said opening, provided with a shoulder adapted to engage said cap and adapted to extend into the electrolyte of said cell, and a resilient metallic retaining member resiliently securing said electrode in position.

In testimony whereof, we have hereunto set our hands at San Diego, California, this 2nd day of June, 1923.

GEORGE C. McINTYRE.
STEPHEN L. BARLOW.